Patented May 27, 1941

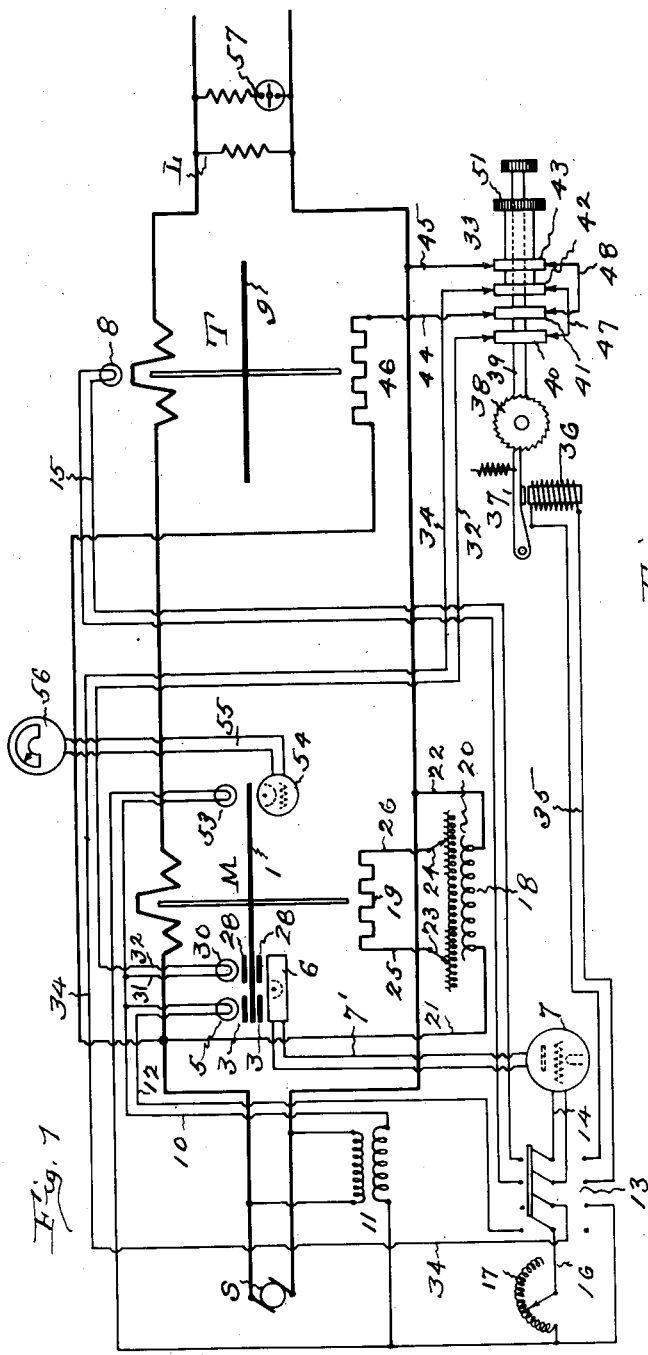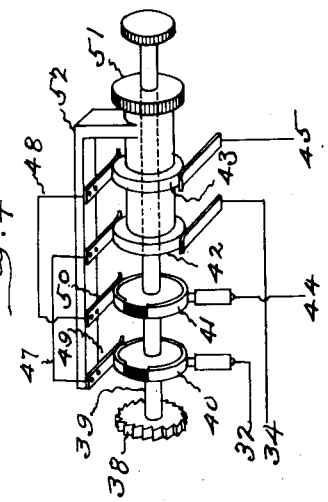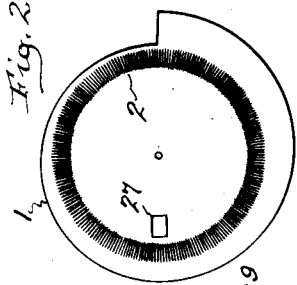

2,243,547

UNITED STATES PATENT OFFICE 2,243,547

STROBOSCOPIC METER TESTING APPARATUS

Frank W. E. Weisse, Corpus Christi, Tex., assignor to The States Company, Hartford, Conn., a corporation of Connecticut Application May 14, 1940, Serial No. 335,152

11 Claims. (Cl. 175—183)

This invention relates to apparatus provided for use in checking, testing and adjusting electric, gas and water meters, of the stroboscopic class.

The object of the invention is the provision of convenient apparatus whereby quick and positive ascertainment of the accuracy of meters under full load and light load may be obtained by observation without eye strain, and which permits the adjustment of the meters to be affected while they are running and under observation and thereby eliminating the loss of time and minimizing the liability of faults in the meters being tested and adjusted.

As the invention is particularly adapted for use in testing electricity meters it is herein described and illustrated as embodied in apparatus for such service.

In the accompanying drawing

Fig. 1 is a diagrammatic illustration of a preferred form of apparatus which embodied the invention.

Fig. 2 is an enlarged plan view of the master meter disk.

Fig. 3 is a plan of the stroboscopic shields that are located adjacent to the master meter disk.

Fig. 4 is an enlarged diagrammatic representation of the start and stop relay controlled switch.

The apparatus indicated has a master meter M, which may be a watt hour meter that is adjusted to correct registration or to a registration approximately correct and whose error is known, and the meter T to be tested, the current coils of which normally are connected in series and the voltage coils connected in multiple between the source S and the load L as hereinafter described.

The revolving disk 1 of the master meter has annularly positioned equally spaced slots or openings 2, desirably one hundred, and located one above and one below the disk are stationary shields 3 each having a number of correspondingly spaced openings 4 so disposed that the openings in the revolving disk will successively come into coincidence with the openings in the stationary shields. A lamp 5 is so placed that a light beam from it will be collimated by the stationary openings when the moving openings are in alignment therewith and will be cut off when the openings in the stationary shields and moving disks are not in alignment.

A photo-electric tube 6 is located to receive the collimated light beams which pass through the openings, and initiate an electric current which fluctuates in coincidence with the beams it receives. An amplifier 7 is connected by conductors 7' with the photo-tube to magnify the increases and decreases of the current impulses initiated by the varying light beams and develop a pulsating current of sufficient strength to light a lamp 8 placed so as to illuminate the rotating disk 9 of the meter T to be tested. The lamp 5 has one terminal connected by conductor 10 to a transformer 11 and the other terminal connected by conductor 12 to a terminal of a double pole double throw switch 13. The amplifier is connected by conductors 14 with terminals of the switch 13 and the lamp 8 is connected by conductors 15 with terminals of the switch 13. One terminal of the switch is connected by conductor 16 with the transformer 11 and an adjustable resistance 17 is preferably placed in this line. When the switch is turned up and these circuits are closed the disk 1 of the meter M and disk 9 of the meter T are rotated and the lamps 5 and 8 lighted, the latter by a pulsating current.

The disk 9 of the meter T is provided with annularly spaced marks of such number and spacing with relation to the openings in the disk of the meter M that if the registration of the meter T is correct the number of marks which will pass a given point in a given interval of time will be the same as the number of flashes of the adjacent lamp 8 which occur in the same interval of time, the marks on the disk 9 being illuminated by the pulsating brightness of the lamp 8 and clearly seen. If the marks on the disk of the meter under test appear to be stationary the registration of the meter T is correct, but should the marks appear to be moving to the right or left the registration of the meter T is incorrect, and this meter may be adjusted while so running until the marks appear stationary.

A transformer 18 with a number of contact taps is arranged in the circuit of the voltage coil 19 of the master meter. The primary coil 20 of the transformer is connected by conductor 21 with one side of the main supply circuit and connected by conductor 22 with the other side of the supply circuit. The voltage coil 19 is adapted to be connected with the secondary coil of the transformer by the adjustable terminals 23, 24 of the conductors 25, 26. If an adjustable terminal is moved along the transformer in one direction the speed of the disk of the master meter will be retarded, and if the adjustable terminal is moved in the opposite direction the speed of the disk of the master meter will be increased due to the fact that in the first case the voltage applied to the disk of the master meter will be less and in the other case it will be greater. The tap connections of the transformer are preferably so designed that for each change of connection of the voltage coil of the master meter the speed of its disk will be altered by a definite percentage. By changing the relation of the connections of the coil of the master meter to the transformer, a voltage condition may be obtained whereby rotations of the disks of the master meter and the meter under test will be the same, and the variation of registrations of the meters determined by the amount of change. By properly marking the taps of the transformer the registration of the meter being tested may be read directly from such markings. The changes of speed of the disk of the master meter may be made while that meter is in operation and the marks on the disk of the meter being tested brought to an apparent stop and its registration then corrected.

For testing the meter under light load means are provided whereby the rotations of the disk of the master meter and disk of the meter under test may be automatically started and stopped after a single or a predetermined number of revolutions in order to disclose the relative distances of travel of the disks. For this purpose the disk 1 of the master meter M in addition to the annularly positioned spaced openings 2, has a single aperture 27 and located one above and one below this disk are stationary shields 28 which have apertures 29 so disposed that during each revolution of the disk 1 the apertures will come into alignment. A lamp 30 is so located that a beam from it will be collimated when these apertures are in alignment, which is once during each rotation of the disk.

The photo-electric tube 6 which has been previously mentioned as located to receive the collimated light beams which pass through the annularly positioned openings 2 of the master meter disk, is located so as to also receive any beam that is projected through the single aperture 27 when the adjacent lamp 30 is lighted, and this tube, as has been described, is connected with the amplifier 7. One terminal of the lamp 30 is connected by conductor 31 to the supply transformer 11 and the other terminal is connected by conductor 32 to a contact 40 on a relay operated rotatory switch 33, from another contact 42 of which, conductor 34 runs to a contact on the switch 13. As the lamp 30 which projects the beam through the single aperture is lighted by closing the switch 13 in the supply circuit, the lamp 5 which projects the beam through the annularly arranged openings is cut off and the circuit to the rotatory switch 33 is closed.

When the switch 13 is closed for lighting the lamp 30 and closing the rotatory switch circuit it also closes a circuit 35 that leads from the switch 13 to a relay R which is indicated as a solenoid 36 with an armature 37 arranged as a pawl for imparting a step by step movement to a ratchet wheel 38 when impulses are received from the amplifier. The ratchet wheel is attached to the shaft 39 of the rotatory switch 33. This switch is shown as having conducting rings 40, 41 which are fixed on but insulated from the shaft 39 and which are broken to provide circuit opening spaces, the conducting rings 42, 43 which are continuous and are free to turn. Terminals of the circuit 32—34 are engaged with the rings 40—42 that are electrically connected by conductor 47, and terminals of the circuit 44—45 from the voltage coil 46 of the meter being tested, are engaged with the rings 41—43, which are electrically connected by conductor 48. A terminal 49 of the circuit 32—34 which includes the rings 40 and 42, and a terminal 50 of the voltage coil circuit 44—45 which includes the rings 41—43 may be adjusted by turning the knob 51 and connected arm 52 that carries the contacts 49 and 50 which bear on the broken rings 40, 42 and thus altering the distance of these contacts from the breaks in the rings (Fig. 4), so that the number of impulses of the relay which will be required to rotate the switch sufficiently to open these circuits and cut out the voltage coil 46 and lamp 30 may be varied. Each time the single aperture 27 in the disk of the master meter passes between its lighted lamp 30 and the photo-electric tube 6 an amplified current causes the shaft of the rotary switch to be turned a short distance. When the switch 13 is closed and the lamp 30 is lighted the disk of the meter being tested is started and will rotate one revolution or more than one revolution, according to the setting of the switch 33, and then stopped.

If the disk of the master meter makes exactly one revolution and the disk of the meter being tested makes exactly one complete revolution the registrations of the meters will be the same, but if the disk of the meter under test makes more than a revolution or less than a revolution for each revolution of the master meter disk, then the meter under test is out of registration and should be adjusted. By marking the disk of the meter under test with marks in number directly proportional to the marks on the disk of the master meter it is possible to read the registration of the meter under test from the number of marks that pass a given point during the interval of test divided by the number of revolutions of the disk of the master meter.

The same disk in the master meter and the same photo-electric tube and amplifier are used for both the stroboscopic high load test with the disks rotating fast, and for testing by the start and stop method when the load is light and the disks rotate slowly.

When testing at light load by the start and stop means and the master meter disk is turning slowly there is liable to be delay owing to the position of the aperture 27 in the master meter disk before the starting impulse is given by the effect of the beam of light projected from the lamp 30 onto the photo-electric tube 6. To lessen this delay means, such as resistance and switch 57, are connected in the main circuit for increasing the load to approximately full load. This extra load is employed until the single aperture 27 in the disk of the master meter reaches a point just in advance of the position which allows the starting light beam to become effective on the photo-tube, and then is cut out. To prevent the aperture 27 from approaching that point too closely or at too great speed the periphery of the disk 1 of the master meter may be made in the form of a spiral, as illustrated in Fig. 2. A lamp 53 is so placed that its light beam will be completely cut off from a photo-voltage cell 54 when the maximum diameter of the disk is between the lamp and cell but will gradually increase its effect upon the photo-voltage cell until the smallest diameter of the spiral is below the lamp. The variations in the strength of the light beam falling upon this cell during a revolution of the disk 1 causes an electric current to be initiated which varies in strength from minimum to maximum during each revolution. This cell 54 is connected by conductors 55 to an indicator 56 the pointer of which will swing over a scale in synchronism with the revolution of the disk of the master meter, thus enabling the operator to see the approximate position of the aperture in the master meter disk and know when to speed up the disk to shorten the waiting time, and when to allow the disk to come to normal light load speed in order to prevent the aperture from approaching the lamp at too high speed.

With current supplied from the source and both meters running, when the switch 13 is turned up the lamp 5 is lighted and its intensity regulated by the adjustable resistance 17. With this connection current is supplied to the lamp 8 with an intensity which varies according to the stroboscopic effect of the light beam from the lamp 5 on the photo-electric tube 6 as increased and decreased by the amplifier 7 that is connected with the lamp 8 placed to throw light on the disk 9 of the meter being tested. As stated, if the marks on the disk 9 of the meter being tested when illuminated by the lamp 8 appear to be stationary the meters register alike. If the marks appear to be traveling in one direction or in the other direction the registration of the meter being tested is inaccurate.

If the meters are out of registration the connections of the voltage coil 19 of the master meter to the transformer may be varied and so alter the voltage effect of the coil 19 until the marks on the disk 9 appear to be stationary, and as pointed out, the changes required in the connections of the voltage coil 19 to the transformer 18 may be noted.

When the switch 13 is turned down the circuits to the lamp 5 and to the lamp 8 are opened and the circuits to the lamp 30 and relay are closed. Under this condition the light beam of the lamp 30 on the photo-electric tube 6 becomes effective and the current amplified so as to cause the relay to act once during each revolution of the master meter disk 1. According to the setting of the contacts 49—50 of the rotary switch 33 the circuits to the lamp 30 and voltage coil 46 are opened and closed at one revolution or a number of revolutions of the disk 1 of the master meter and the rotation of the meter disk 9 is stopped and the relation of travel of the disks observed. The circuit including the lamp 53 being energized from the transformer 11 this lamp may be kept lighted continuously and by reason of its action on the photo voltage cell 54 the rotatory position of the disk 1 of the master meter indicated at all times. To eliminate loss of time when testing under light load and temporarily speed up the rotation of the disk 1 of the master meter the switch 57 is closed and additional load supplied until the position indicator 56 warns that it is time to let the disk slow down to the normal slow speed and the additional resistance be cut out.

With the apparatus arranged as described meters connected therewith may be very quickly tested under full load and under light load and any variations in the registrations of the meters being tested quickly observed and indicated so that corrections of the registrations of the meters may be immediately effected, and the tests may be made at the factory or on the customers' premises.

The invention claimed is:

1. Apparatus for testing meters which comprises a master meter and a meter to be tested connected between a source of medium to be measured and point of utilization of said medium, a disk having a plurality of apertures rotatable in the master meter and a disk bearing marks proportionately related to said apertures rotatable in the meter to be tested, a lamp and stationary screens with corresponding and aligned apertures arranged one above and one below the master meter disk to produce a succession of collimated stroboscopic light effects as said disk rotates, a photo-electric tube subject to said light effects and initiating fluctuating energy, electrical means for magnifying the energy thus produced, a lamp arranged adjacent the rotatable disk of the meter under test and adapted to be electrically connected with said magnifying means and respond to the fluctuations of said energy and a transformer connected in the circuits of the two meters, the connections of said transformer being adapted to be altered in direct proportion to the meter under test whereby if the two meters do not register, the voltage supply to the master meter may be altered by definite amounts until the meters register the same.

2. Apparatus for testing meters which includes a master meter and a meter to be tested connected between a source of electrical energy and a load, with a disk having apertures at different distances from the axis of said disk, rotatable in the master meter and a disk bearing marks proportionately related to said apertures rotatable in the meter to be tested, which comprises lamps and perforated screens arranged adjacent the master meter disk at different distances from the axis of the master meter disk and adapted to produce periodic light effects as said disk rotates, a photo-electric tube subject to said light effects and initiating pulsating electrical energy, an amplifier for magnifying the pulsating energy thus produced, a lamp arranged adjacent the rotatable disk of the meter under test and adapted to be electrically connected with said amlifier and respond to the fluctuations of said energy, means adapted to be electrically connected with said amplifier for opening and closing the voltage circuit of the meter under test, and means for connecting the amplifier in the circuit of said last mentioned lamp and for connecting the amplifier with said voltage circuit opening and closing means.

3. Apparatus as described in claim 2 wherein the means adapted to open and close the voltage circuit of the meter under test includes a relay and rotary switch actuated thereby.

4. Apparatus as described in claim 2 wherein the amplifier is adapted to be connected to operate a relay and cause the relay to operate a switch that opens and closes the voltage circuit of the meter under test and also opens and closes the circuit of the lamp which produces the periodic light effect which through the amplifier actuates said relay.

5. Apparatus for testing meters which comprises a master meter and a meter to be tested connected between a source of electrical energy and a load, a disk having a volute periphery rotatable in the master meter, a lamp arranged to cast a light beam on one side at the periphery of said disk in the master meter and to produce a variable light effect on the other side as said disk rotates, current initiating means subject to said light effect, and means connected to said current initiating means and responsive to the energy of the current produced thereby for indicating the angular position of said disk.

6. Apparatus as described in claim 5 in which the current producing means is a photo voltage cell.

7. Apparatus for testing meters which includes a master meter and a meter to be tested with a disk rotatable in the master meter provided with a series of annularly arranged openings and a single aperture and a disk rotatable in the meter to be tested provided with marks proportionately related to said annularly arranged openings, means for producing a stroboscopic light effect through the annularly arranged openings in the disk of the master meter and also to produce a periodic light effect through the single aperture in said disk, means for initiating electric current by said light effects, means for amplifying said initiated current, a lamp located adjacent to the meter to be tested, a relay, a switch in the voltage circuit of the meter to be tested designed to be actuated by impulses occurring in the relay, a switch adapted to connect the amplifier with conductors to the lamp adjacent the meter to be tested or to connect the amplifier with conductors to the relay, whereby when the switch is thrown to one position, owing to the stroboscopic effect of the light which passes through the annularly arranged openings in the master meter disk a fluctuating light is cast upon the disk of the meter under test, and when the switch is thrown into another position, owing to the periodic effect of the light which passes through the single aperture in the master meter disk the relay is actuated to move the switch in the voltage circuit of the meter being tested a distance depending upon the adjustment of said switch.

8. Apparatus for testing meters which includes a master meter and a meter to be tested, stroboscopic means for producing electric current and causing the rotating disk of the meter to be tested to be illuminated with a light which fluctuates relatively to the speed of the rotating disk of the master meter, means for producing an intermittent electric current and a relay operated switch actuated by said intermittent current for causing the disk of the meter under test to be started and stopped, and means for indicating the angular position of the disk of the master meter.

9. Apparatus for testing meters which includes a master meter and a meter to be tested, stroboscopic means for producing electric current and causing the rotating disk of the meter to be tested to be illuminated with light which fluctuates relatively to the speed of the rotating disk of the master meter, means for producing an intermittent electric current and a relay operated switch actuated by said intermittent current for causing the disk of the meter under test to be started and stopped, means for altering the speed of the disk of the master meter, and means actuated by the rotation of the master meter disk for indicating the angular position of said disk.

10. In an apparatus for comparing a service meter with a standard meter, an apertured disk rotatable in the standard meter, a marked disk rotatable in the service meter, a fixed apertured screen above and a fixed apertured screen below the disk in the standard meter, a lamp arranged to throw a steady beam of light upon one of said screens, a photo electric tube located to receive a succession of beams of light that are permitted to pass from said lamp through the fixed screen apertures and standard meter disk apertures as the said disk rotates and initiate a fluctuating energy in said photo-tube, an amplifier connected in series with and designed to magnify the fluctuating energy initiated by the photo-electric tube, a lamp electrically connected to the amplifier and located to illuminate with a fluctuating light the marked disk in the service meter, whereby the marked service meter disk is exposed to a light that fluctuates in synchronism with the rotation of the apertured master meter disk, a transformer with primary elements connected to the main circuit conductors and the secondary elements connected to the voltage coil of the master meter, said connections being adapted to be altered in direct proportion to the registration of the meter under test whereby if the two meters do not register the same, voltage supplied to master meter may be altered by definite amounts until the meters register the same.

11. Apparatus for testing meters which comprises a master meter and a meter to be tested connected between a source of electrical energy and a load, a disk having a plurality of apertures rotatable in the master meter and a disk bearing marks proportionately related to said apertures rotatable in the meter to be tested, a lamp and stationary screens with corresponding and aligned apertures arranged one above and one below the master meter disk to produce collimated stroboscopic light effects as said master meter disk rotates, a photo-electric tube subject to said light effects for initiating pulsating electrical energy, an amplifier for magnifying the pulsating energy thus produced, a lamp arranged adjacent the rotatable disk of the meter to be tested and adapted to be electrically connected with said amplifier and respond to the fluctuations of said energy, and a transformer with its primary element connected to the main circuit conductors of the two meters and its seccuit conductors of the two meters and its secondary element connected to the voltage coil of the master meter, the connections of said transformer to said voltage coil being adapted to be altered in direct proportion to the registration of the meter under test whereby if the two meters do not register the same, the voltage supplied to the master meter may be altered by definite amounts until the meters register the same.

FRANK W. E. WEISSE.